United States Patent
Kurapati et al.

(10) Patent No.: US 8,006,266 B2
(45) Date of Patent: Aug. 23, 2011

(54) METHOD FOR USING ONLY FEEDBACK FROM SHOWS THAT IMPROVE THE PERFORMANCE OF THE RECOMMENDER SYSTEM

(75) Inventors: Kaushal Kurapati, Yorktown Heights, NY (US); Srinivas Gutta, Yorktown Heights, NY (US)

(73) Assignee: Pace LLC, West Yorkshire (GB)

( * ) Notice: Subject to any disclaimer, the term of this patent is extended or adjusted under 35 U.S.C. 154(b) by 3554 days.

(21) Appl. No.: 10/179,315

(22) Filed: Jun. 24, 2002

(65) Prior Publication Data

US 2003/0237087 A1 Dec. 25, 2003

(51) Int. Cl.
*H04N 5/445* (2011.01)
(52) U.S. Cl. .............................. 725/46; 725/9
(58) Field of Classification Search .................. 725/46, 725/9
See application file for complete search history.

(56) References Cited

U.S. PATENT DOCUMENTS

| | | | |
|---|---|---|---|
| 5,410,344 A | * | 4/1995 | Graves et al. .................. 725/46 |
| 5,534,911 A | | 7/1996 | Levitan ........................ 725/46 |
| 6,005,597 A | | 12/1999 | Barrett et al. .................. 735/46 |

FOREIGN PATENT DOCUMENTS

| | | |
|---|---|---|
| WO | 0120904 A1 | 3/2001 |
| WO | 0160063 A2 | 8/2001 |
| WO | 0167752 A2 | 9/2001 |

* cited by examiner

*Primary Examiner* — William Trost, IV
*Assistant Examiner* — Oschta Montoya
(74) *Attorney, Agent, or Firm* — Nixon Peabody LLP; Joseph M. Noto

(57) ABSTRACT

In customizing a user profile employed by a recommendation system, users are prompted for feedback regarding content that is the subject of the recommendation system. Only feedback that does not degrade performance of the recommendation system, as measured by the error rate, is accepted and utilized to modify the user profile. Feedback that would degrade performance is discarded without being employed to alter the user profile. In this manner, error is continually driven toward a minimum by system changes based on feedback.

15 Claims, 2 Drawing Sheets

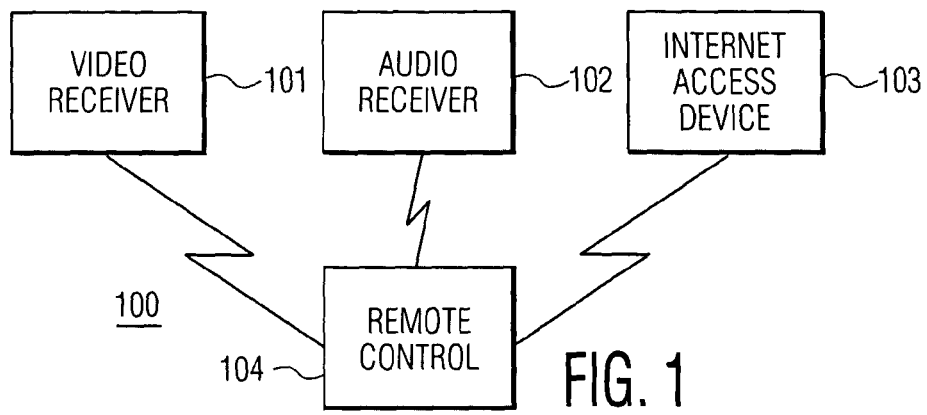
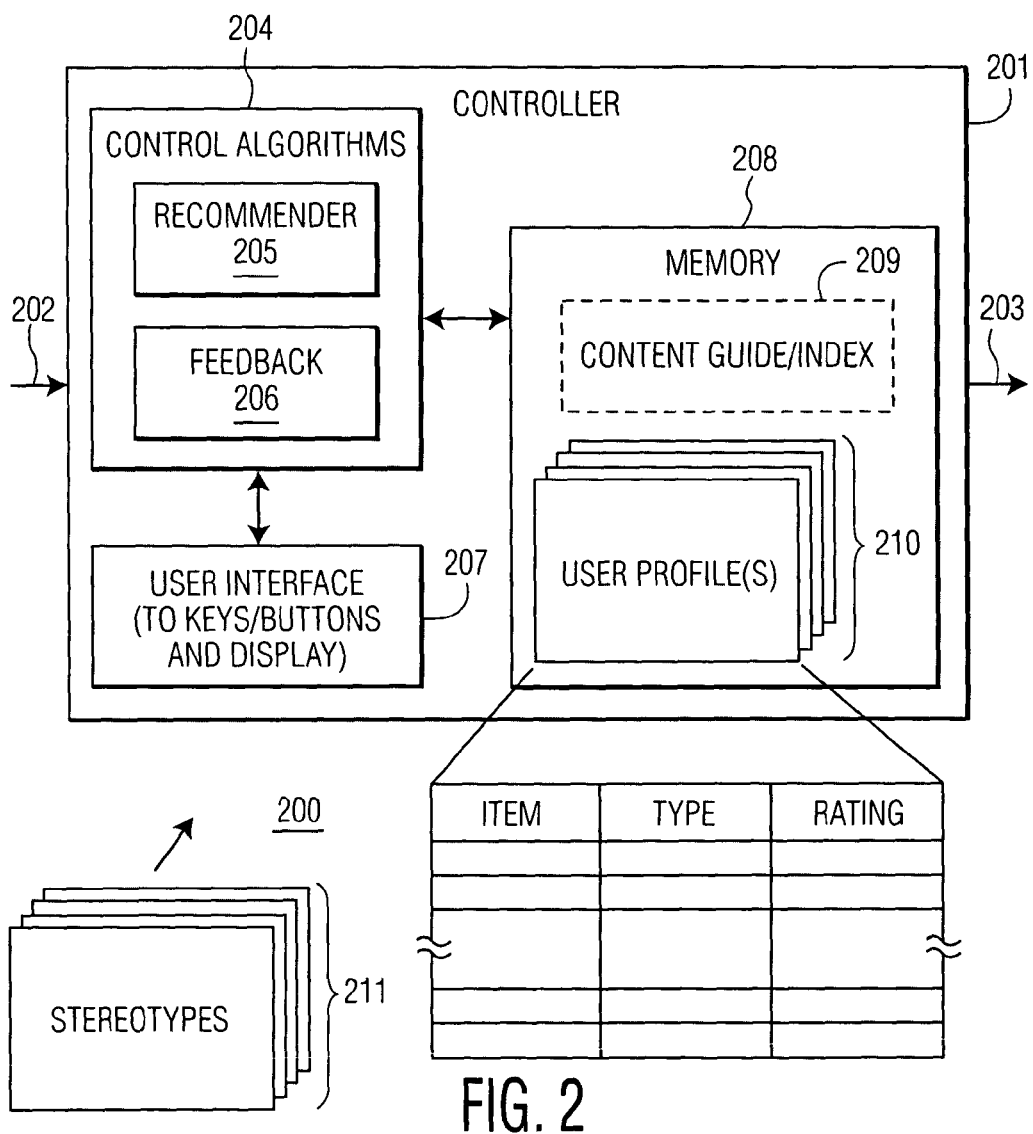

METHOD FOR USING ONLY FEEDBACK FROM SHOWS THAT IMPROVE THE PERFORMANCE OF THE RECOMMENDER SYSTEM

TECHNICAL FIELD OF THE INVENTION

The present invention is directed, in general, to use of feedback in recommendation systems and, more specifically, to selective use of user feedback to improve performance of recommendation systems.

BACKGROUND OF THE INVENTION

Systems employed in generating guides, or information regarding available options in connection with a particular activity, may produce suggestions or recommendations for the user. Examples of such systems include on-line shopping or information retrieval systems and systems for delivery of content, particularly entertainment content such as audio or video programs, games and the like. In the case of systems delivering entertainment content, automatic action may be triggered by the generation of a suggestion or recommendation, such as caching, during a period when the entertainment content is not being utilized by the user, at least a portion of available entertainment content for later presentation to the user.

In generating suggestions or recommendations, suitable results are most often obtained by employing, at least in part, an explicit user profile of likes and dislikes. In general, such explicit user profiles are generated by user access and completion of a profiling questionnaire, within which the user rates various meta-data descriptors such as (for video content) genre, actor(s), director, title, etc.

Populating or developing an explicit user profile typically must be initiated by the user, and often requires (or allows) users to independently enter values for meta-data descriptors, such as an actor's name or the title of video content. This forces the user to attempt to remember, at the time of profile creation, all relevant values for meta-data descriptors on which actions employing the profile should be based, which is difficult if not impossible.

On the other hand, displaying a list of all possible meta-data descriptor values to the user, from which selections may be made to populate the user's profile, will generally result in the user having to review a list of unwieldy size, or risk missing suitable descriptors. Particularly for cross-media systems (i.e., video, audio and/or other content), the user might be required to select and/or rate items from a list containing tens of thousands of entries. Either alternative (requiring the user to recall relevant items or presenting the user with a comprehensive list), or even a combination of the two approaches, is unduly demanding on the user and requires more time than a user is likely to be willing to spend on the task, and is therefore unsatisfactory.

A quick and effective technique for initializing a user profile involves stereotypes derived from analysis of the viewing patterns of a multitude of users. The user selects a stereotype or set of stereotypes to initialize the profile, and thereafter provides feedback to the system in order to guide the system on how to lower the "error" rate and make better suggestions. For video program recommendation systems, for example, the feedback is often in the form of a "Yes, I liked the show" or "No, I didn't like the show," perhaps with varying degrees of intensity.

Not all feedback from the user, however, will improve the system's error rate. A particular piece of feedback might improve the user understanding in one area while making it worse in one or more other area(s). The Combined effect, measured in terms of error rate, could be worse, overall.

There is, therefore, a need in the art for improving use of feedback to adapt a stereotype to user preferences in a recommendation system.

SUMMARY OF THE INVENTION

To address the above-discussed deficiencies of the prior art, it is a primary object of the present invention to provide, for use in a recommendation system, customization of a user profile employed by a recommendation system in which users are prompted for feedback regarding content that is the subject of the recommendation system. Only feedback that does not degrade performance of the recommendation system, as measured by the error rate, is accepted and utilized to modify the user profile. Feedback that would degrade performance is discarded without being employed to alter the user profile. In this manner, error is continually driven toward a minimum by system changes based on feedback.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 1 depicts a system selectively employing feedback to customize a stereotype based user profile according to one embodiment of the present invention;

FIG. 2 depicts a system controller implementing selective utilization of feedback to customize a stereotype based user profile according to one embodiment of the present invention.

DETAILED DESCRIPTION OF THE INVENTION

Figure 3:
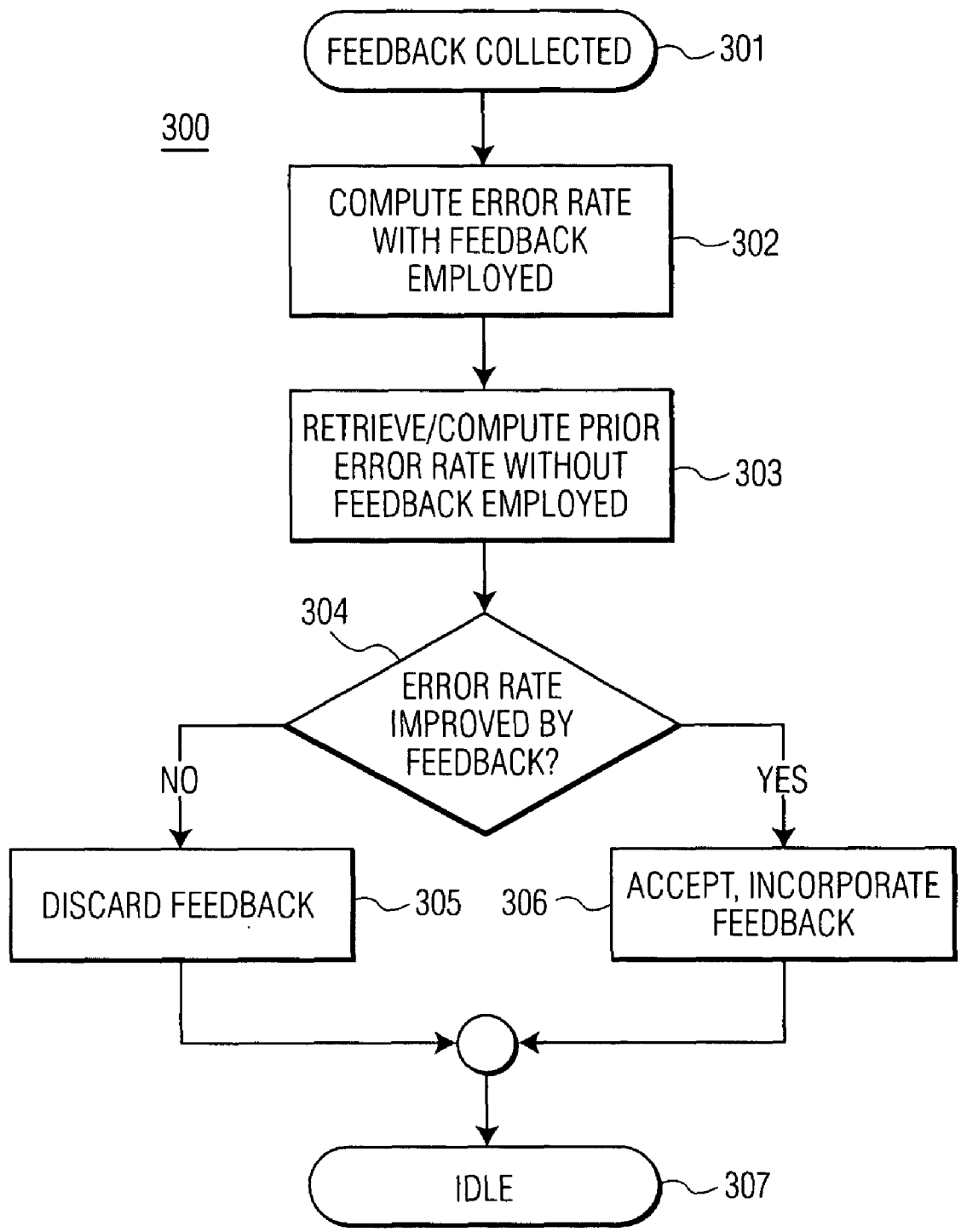
FIG. 3 is a high level flowchart for a process of selectively employing feedback to customize a stereotype based user profile according to one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

FIG. 1 depicts a system selectively employing feedback to customize a stereotype based user profile according to one embodiment of the present invention. Exemplary system 100 includes: a video receiver and/or playback unit 101 such as a television, a satellite, terrestrial, or cable television broadcast decoder unit, or a digital video recorder; an audio content receiver and/or playback unit 102, such as a terrestrial or satellite radio receiver or a compact disc or digital audio player; and a Internet access device 103 such as a set-top box, personal computer or the like. In the example shown, system 100 further includes a remote control unit 104 capable of interoperating with and controlling the operation of one or more (preferably all) of video receiver 101, audio receiver 102 and Internet access device 103.

Those skilled in the art will recognize that the full construction and operation of a system employing context-based, system initiated user interactions to populate an explicit profile is not depicted or described herein. Instead, for simplicity and clarity, only so much of the construction and operation of the system as is unique to the present invention or necessary for an understanding of the present invention is depicted and described. The remainder of the construction and operation of the system may conform to conventional structures or practices known in the art. Moreover, although a video receiver, an audio receiver, an Internet access device, and a remote control are illustrated in the exemplary embodiment, those skilled in the art will recognize that the functionality described herein may be readily adapted to other types of devices such as, for example, game devices, and thereby employed with other forms of content or in connection with other activities.

FIG. 2 depicts a system controller implementing selective utilization of feedback to customize a stereotype based user profile according to one embodiment of the present invention. The controller hardware and programming 201 for system controller 200 may be implemented in any of video receiver 101, audio receiver 102, Internet access device 103, or remote control 104 depicted in FIG. 1 or in similar devices. Alternatively, controller hardware and programming 201 may be implemented in distributed fashion, with various portions being disposed within two or more of the devices forming the video receiver 101, the audio receiver 102, the Internet access device 103, and the remote control 104.

However implemented, system controller 200 includes at least one input 202 for receiving content and user input control signals, and at least one output 203 for presenting content and user interface displays. System controller 200 receives at least information regarding content available from one or more external sources (not shown) such as a broadcasting facility or a broadcast or Internet content server. In the exemplary embodiment, system controller 200 also selectively receives some of the associated content.

System controller 200 includes control algorithms 204 for controlling operation of one or more of the devices forming the video receiver 101, the audio receiver 102, the Internet access device 103, and the remote control 104. In the exemplary embodiment, the control algorithms 204 include a recommendation utility 205 for generating suggestions based on an explicit user profile and a profile customization (feedback) utility 206 for collecting and selectively employing user feedback to customize a user profile as described in further detail below.

Control algorithms 204 are operatively coupled to user interface controls 207 (e.g., buttons or keys, an infrared receiver, and/or a user interface display generator) and to a memory 208 optionally containing a content (e.g., program) guide or index 209 and one or more user profiles 210. As shown, each user profile is, at least in part, an explicit profile in which each specific item associated with a general class or type, or meta-data categories for particular content items (e.g., genre, actor, etc.), each have an associated rating. At least initially, the ratings are derived from a stereotype selected by the user based on geographic origin, general preferences, and the like. During initialization of the system 200, the user selects one of a plurality of stereotypes 211, with the selected stereotype being loaded, e.g., from an external source.

Controller 204 employs user feedback for content to customize user profiles. By way of example, if a user is watching a video program, controller 204 may initiate a user interface query requesting the user to respond with their level of interest (rating) for the program. The feedback may be simply of limited alternatives such as "Yes, I like the program" or "No, I don't like the program." Alternatively, the feedback may request the user to select one of a number of response gradations from "strongly like" through "don't care" to "strongly dislike." In other embodiments, the user may be prompted for a whole number rating of the program within the range of one to ten or one to one hundred.

The user feedback may be input, for example, by the user selecting an arbitrary integer within a predetermined range (e.g., 1 to 100), by the user selecting from among pre-defined values (e.g., "strongly like" or "moderately dislike"), and/or by the user operating a "slider" user control within the predetermined range.

In the present invention, controller 204 employs user feedback selectively to customize user profiles. Specifically, before modifying a user profile based on received user feedback, controller 204 preliminarily considers the feedback and estimates the overall error using a profile including modifications according to the feedback. If the overall error is worse than before modification of the user profile based on the newly-received feedback, the system discards the feedback. In this manner, the system 200 attempts to always drive the error in one direction: down toward a minimum.

The error of a customized user profile may be determined in any of a variety of manners. For example, a correlation history between system recommendations and user selections and/or feedback may be maintained, and a particular user profile configuration tested against whether previous user selections (or programs which received favorable feedback from the user) would be recommended. The correlation history may be a rolling tally corresponding to a predetermined number of prior system recommendations and/or user selections/feedback, or during a particular period (e.g., the preceding six months).

Instead of accepting and employing all feedback from a user, the present invention intelligently utilizes only feedback that improves the recommendation performance of the system, as measured by error route.

FIG. 3 is a high level flowchart for a process of selectively employing feedback to customize a stereotype based user profile according to one embodiment of the present invention. The process 300 of selecting which feedback to employ and which to discard begins with user feedback being received relating to a profile derived from a stereotype (step 301). The user profile with any modifications appropriate for the newly received feedback is employed to determine a system error rate (step 302). The system error rate for the user profile without modifications according to the newly received feedback is computed (step 303), if necessary, and the two error rates are compared (step 304). If the error rate is bound to go up with the modifications to the user profile resulting from the new feedback, the new feedback is discarded without modifying the user profile (step 305). However, if the error rate is decreased by the modifications to the user profile based on the new feedback, the feedback is accepted and the associated modifications are incorporated into the user profile (step 306). Subsequent recommendations are then made based upon the modified user profile. The process then becomes idle until additional feedback is collected from the user.

The present invention in incorporated into a system transforming stereotypes into personalized user profiles. By selectively utilizing only user feedback that improves the recommendation performance of the system, the present invention provides for a means for continually driving the system error rate down.

It is important to note that while the present invention has been described in the context of a fully functional system, those skilled in the art will appreciate that at least portions of the mechanism of the present invention are capable of being distributed in the form of a machine usable medium containing instructions in a variety of forms, and that the present invention applies equally regardless of the particular type of signal bearing medium utilized to actually carry out the distribution. Examples of machine usable mediums include: nonvolatile, hard-coded type mediums such as read only memories (ROMs) or erasable, electrically programmable read only memories (EEPROMs), recordable type mediums such as floppy disks, hard disk drives and compact disc read only memories (CD-ROMs) or digital versatile discs (DVDs), and transmission type mediums such as digital and analog communication links.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A system for customizing a user profile for a recommendation system comprising:
   a hardware controller selectively receiving user feedback relating to content forming the subject for the recommendation system and checking an error rate for a user profile with modifications based upon the user feedback with an error rate for the user profile without the modifications, wherein
   the controller only permanently incorporates the modifications in the user profile if the error rate is not degraded by the modifications.

2. The system according to claim 1, wherein the controller discards the modifications based upon the user feedback if the error rate is degraded by the modifications.

3. The system according to claim 1, wherein the controller tests the error rate utilizing the user profile with one or more test cases with and without the modifications.

4. The system according to claim 3, wherein the controller tests the error rate utilizing a correlation between past recommendations and user selections.

5. The system according to claim 1, wherein the controller accepts the modifications to the user profile based upon the user feedback only if the error rate is improved by the modifications.

6. A system for customizing a user profile for a recommendation system comprising:
   a video receiver;
   a video display device;
   a remote control operative to selectively control operation of the video receiver, the video display device, or both; and
   a controller within one or more of the video receiver, the video display device, and the remote control, the controller selectively receiving user feedback relating to content forming the subject for the recommendation system and checking an error rate for a user profile with modifications based upon the user feedback with an error rate for the user profile without the modifications,
   wherein the controller only permanently incorporates the modifications in the user profile if the error rate is not degraded by the modifications.

7. The system according to claim 6, wherein the controller discards the modifications based upon the user feedback if the error rate is degraded by the modifications.

8. The system according to claim 6, wherein the controller tests the error rate utilizing the user profile with one or more test cases with and without the modifications.

9. The system according to claim 8, wherein the controller tests the error rate utilizing a correlation between past recommendations and user selections.

10. The system according to claim 6, wherein the controller accepts the modifications to the user profile based upon the user feedback only if the error rate is improved by the modifications.

11. A method of customizing a user profile for a recommendation system comprising:
   selectively receiving user feedback relating to content forming the subject for the recommendation system;
   checking, by a hardware controller, an error rate for a user profile with modifications based upon the user feedback with an error rate for the user profile without the modifications; and
   permanently incorporating the modifications in the user profile only if the error rate is not degraded by the modifications.

12. The method according to claim 11, wherein the modifications based upon the user feedback are discarded if the error rate is degraded by the modifications.

13. The method according to claim 11, wherein the error rate is tested utilizing the user profile with one or more test cases with and without the modifications.

14. The method according to claim 13, wherein the error rate is tested utilizing a correlation between past recommendations and user selections.

15. The method according to claim 11, wherein the modifications to the user profile based upon the user feedback are accepted only if the error rate is improved by the modifications.

* * * * *